Figure 1:
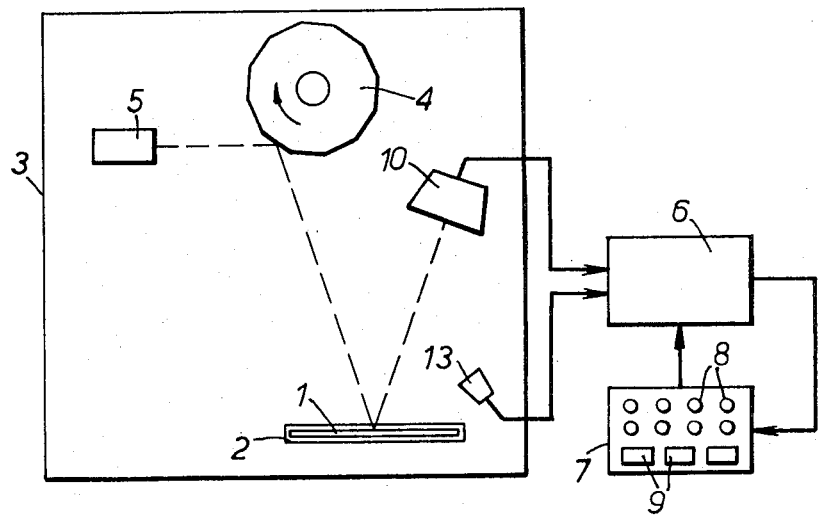

United States Patent [19]

Bossons

[11] 3,803,420

[45] Apr. 9, 1974

[54] PROGRAMMED SURFACE INSPECTION USING RADIATION SENSITIVE MEANS

[75] Inventor: Walter Howard Bossons, Almondsbury, England

[73] Assignee: Masson Scott Thussell Engineering Limited, Bristol, Great Britain

[22] Filed: Sept. 20, 1972

[21] Appl. No.: 290,749

[30] Foreign Application Priority Data
Sept. 23, 1971 Great Britain .................... 44367/71

[52] U.S. Cl............. 250/562, 250/214 R, 250/572, 356/200
[51] Int. Cl. ........................................ G01h 21/32
[58] Field of Search...250/219 DF, 562, 572, 214 R; 356/102, 200, 205, 237

[56] References Cited
UNITED STATES PATENTS
3,543,360  12/1970  Fertig................................. 356/200
3,534,402  10/1970  Crowell et al. ................. 356/200 X
3,280,692  10/1966  Milnes et al. .................... 356/200 X
3,286,567  11/1966  Wright...................... 250/219 DF X Primary Examiner—Walter Stolwein
Attorney, Agent, or Firm—Young and Thompson

[57] ABSTRACT

In an apparatus for inspecting the surface of a sheet for flaws, a flying spot of light reflected by the sheet is received by a photocell and the signal from the photocell, representing variations in the surface characteristics is fed to a plurality of analysing circuits, each one concerned with recognising one particular characteristic, such as an integrated amplitude level indicating the frequency of spots, a repetition pattern indicting the pressure of a longitudinal fault or a timed continuity indicating a transverse fault. Selection means is provided for selecting appropriate circuits to be actuated or for adjusting component factors of the analysing circuits.

13 Claims, 2 Drawing Figures

PROGRAMMED SURFACE INSPECTION USING RADIATION SENSITIVE MEANS

This invention relates to the inspection of sheet material for surface defects or characteristics.

Amongst the known methods of inspecting the quality of the surface of a sheet or web of flat material such as paper, one of the most successful is to scan the surface sequentially with a "flying spot" of light. A photo-electric cell, photo-multiplier or similar device is arranged to receive the light reflected back from the surface and, if ambient lighting is restricted or eliminated then the only light returning to the photo-cell is that reflected from that part of the surface momentarily illuminated by the flying spot. The flying spot of light can be produced by several methods, a convenient one being the focusing of a point source of illumination on to the paper via an intermediate revolving or oscillating mirror system. In another, similar embodiment the point source of light can be replaced by a substantially parallel beam of coherent light produced by a laser which results in the simplication of the general optical system.

The instantaneous position of the flying spot on the material to be inspected can be derived from information supplied by a suitable transducer driven by the revolving mirror or oscillating mirror, or by an electrically synchronised pulse generator, and if this is combined with the electrical signal obtained from the photo-cell, a complete picture of the apparent reflectivity of the surface of the material can be built up.

Several successful inspection systems for paper, paperboard, metal film, plastics film etc., have been developed using this fundamental system and also using a similar system where the photo-electric cell is positoned on the opposite side of the material to be inspected. In this latter system variations in transparency of the material will produce variations in the signal and by this means black spots on a transparent or translucent material such as paper can be determined, as can pin holes in an opaque or translucent material.

This invention is concerned, amongst other factors, with the processing and subsequent presentation of the information derived from the photo-electric cell. The information will, generally, be in the form of electrical impulses usually of short duration rising above a "plateau" of "noise," this plateau representing the average surface texture (in the case of a reflected signal) or variations in density (in the case of a transmitted signal) of the material under investigation, while each peak represents a defect or irregularity in the surface.

Existing inspection systems using these techniques may set arbitrary amplitude levels and count or otherwise collect information regarding the number of impulses exceeding one such arbitrary amplitude level, or the average number of such impulses arising in a fixed time, and means may be provided for manual adjustment of certain variable control factors.

This gives some indication of the incidence of defects exceeding a certain density or size. It is possible to have two or more such arbitrary levels established when the apparent density of the defects can be further categorized. Another system allows the presence of defect signals (above a certain threshold) to be collected and integrated into a steady signal using a "diode pump" or similar circuit which effectively integrates the total signal content over a fixed period of time. By this means both the duration and intensity of a fault is summed and an average reading may be displayed on a meter or otherwise giving an indication of the "quality" of the material being inspected. This information may then be used to trigger a voltage sensitive relay or similar device which could actuate suitable mechanisms and cause the faulty part of the material under investigation to be rejected as it passes through a machine. A manually operated sensitivity adjustment may be added to the system to cater for different inspection requirements.

It has now been found that paper and board, when inpsected in such a way, exhibits typical fault patterns which can be related to particular manufacturing defects in the material and to particular types of visible fault. There are many uses for paper, board and similar materials, each use having its own particular set of criteria for good or bad material and if an automatic inspection system is included in the paper manufacturing or subsequent processing system it is desirable that these quality criteria can be specified more precisely for each particular requirement.

Broadly stated the invention consists in apparatus for inspecting the surface of a sheet, comprising an optical scanner and a video-transducer for producing an electrical signal representing variations in selected characteristics of the surface, a plurality of electrical analysing circuits for determining the presence or value of selected characteristics of the signal, corresponding to selected characteristics of the surface, and selector means for selectively energising and/or adjusting the analysing circuits.

It is preferred that all or the majority of the selector means are non-continuously variable, multi-position, binary or stepping type switching devices. Ideally the apparatus includes a master control unit, and remote control means for actuating at least some of the selector means therefrom.

According to yet another preferred feature of the invention the apparatus includes at least one pre-programmed analysing circuit for determining a compound characteristic or characteristics of the signal, for example an integrated amplitude level, or a repetition pattern, or a timed continuity at a selected amplitude.

From a more detailed aspect the invention consists in apparatus for monitoring, by way of inspecting, checking, analysing or recording the characteristics or quality of a sheet, and ideally including also means for providing a warning or actuating signal in response to selected characteristics or levels of the sheet, comprising an optical scanner for scanning the sheet, a photo-electric receiver for producing a signal corresponding to the observed (reflected or transmitted) light, and means for comparing one or more characteristics or values of the observed signal with corresponding datum signals, comprising a plurality of analysing comparator circuits, selector means for selecting appropriate circuits to be actuated and means for adjusting individual values of the datum signals, or other components in the comparator circuits, and/or for adjusting an overall adjusting factor.

In any case the apparatus will preferably include synchronising or timing means to relate the instantaneous observed signal to the instantaneous position of the scanning beam or spot.

In a particular embodiment of the invention an electrical signal derived from the photo-electric cell in an apparatus as described above is fed, after amplification, to a number of electronic devices each of which is arranged to recognise and quantify a particular type of fault on or in the surface. These devices are identified each with one particular type of fault and each provided with a remote means of adjustment which defines the acceptability or otherwise of the material, dependent upon the magnitude of the signal produced by the specific device. By this means a quality classification for a given piece of material can be expressed as a codeword, for example in the form A2, C4, D3, etc. where A, B and C represent specific forms of defect and the number scale 1, 2, 3, 4, 5 — the intensity of the defect as seen by the inspection unit.

Some typical electronic units performing this function are as follows:

1. An amplitude sensing device which responds to signals received from the photo-cell indicating a particular intensity of, for example, black spots on a white base and counts or sums these faults over a certain period of time. This device may cause a reject signal to be given when the number of specks exceeding a certain specification are found within a certain time. As an extension of this device means may be provided to correlate the speed of passage of material through the inspection unit with the time period of the observations, so that the output signal corresponds to an incidence of a certain type of fault within a certain area or length of the material under inspection. Such an amplitude sensing device can comprise filter means allowing signals beyond a predetermined threshold to pass therethrough and a counter for storing the numer of signals passing the filter means.

2. A transverse fault finder to detect transverse joints or splices. If during the passage across a continuous web of material the photo-electric cell receives a continuous "black" (for example) signal and this is repeated for a number of successive scans, there is a high probability that a joint or splice in the web has been detected. This can be appropriately signalled by detecting the sequential repetition of a number of continuous "black" scans, and the output may be used to enable the respective part of the material to be rejected or marked, or to initiate some other control function of a web handling machine. Such a transverse fault finder can comprise filter means allowing signals beyond a predetermined threshold to pass therethrough, and an adder device capable of building up to a predetermined warning level only in response to a repetition of signals from the filter means from a predetermined number of successive scans or cycles of the optical scanner.

3. A longitudinal fault finder to detect elongated lengthwise defects, such as creases. If the photoelectric cell receives a "defect" signal at substantially the same point in its sequential traverses across the web there is a high probability that there is a longitudinal crease in the material. An electronic device for recognising this type of defect may be programmed to give a reject signal when either the intensity or apparent length of the crease exceed certain preset limits. Such a longitudinal fault finder can comprise filter means allowing signals beyond a predetermined threshold to pass therethrough, and a monostable multivibrator circuit whose time delay between operations is set to a value approximating to each scan time or cycle of the optical scanner, and an adder device capale of buildng up to a predetermined warning level only in response to a repetition of signals from the multivibrator from a predetermined number of successive scans or cycles of the optical scanner.

4. A general area fault finder for recognising non-standard patches such as stains. If the average "background" level of illumination as seen by the photoelectric cell during a reflecting investigation falls below a certain standard over all or part of the web of material then there is a possibility that a stain of finite size has been found. Appropriate circuitry for this purpose is arranged to detect levels of surface irregularity which would be allowed to pass unnoticed in small specks or lines, but which if maintained over at least part of the scan width for a selected number of sequential scans would trigger a warning or indicating device.

In some practical realizations of the invention the individual circuits are mounted on separate plug-in printed circuit cards, each wired to a selector switch calibrated, typically, 1–10, and each switch designated by a code letter representing a particular kind of fault. The operator, when setting the inspection machine, either from a master control panel or by means of a coded input system such as punched card reader or magnetic tape reader is given instructions for these controls relating to the requirement for the particular material under investigation. This is a substantial improvement upon present practice where the sensitivity of the entire inpsection system can be and often is varied by the operator, depending upon the average quality required from the material under investigation.

Figure 2:
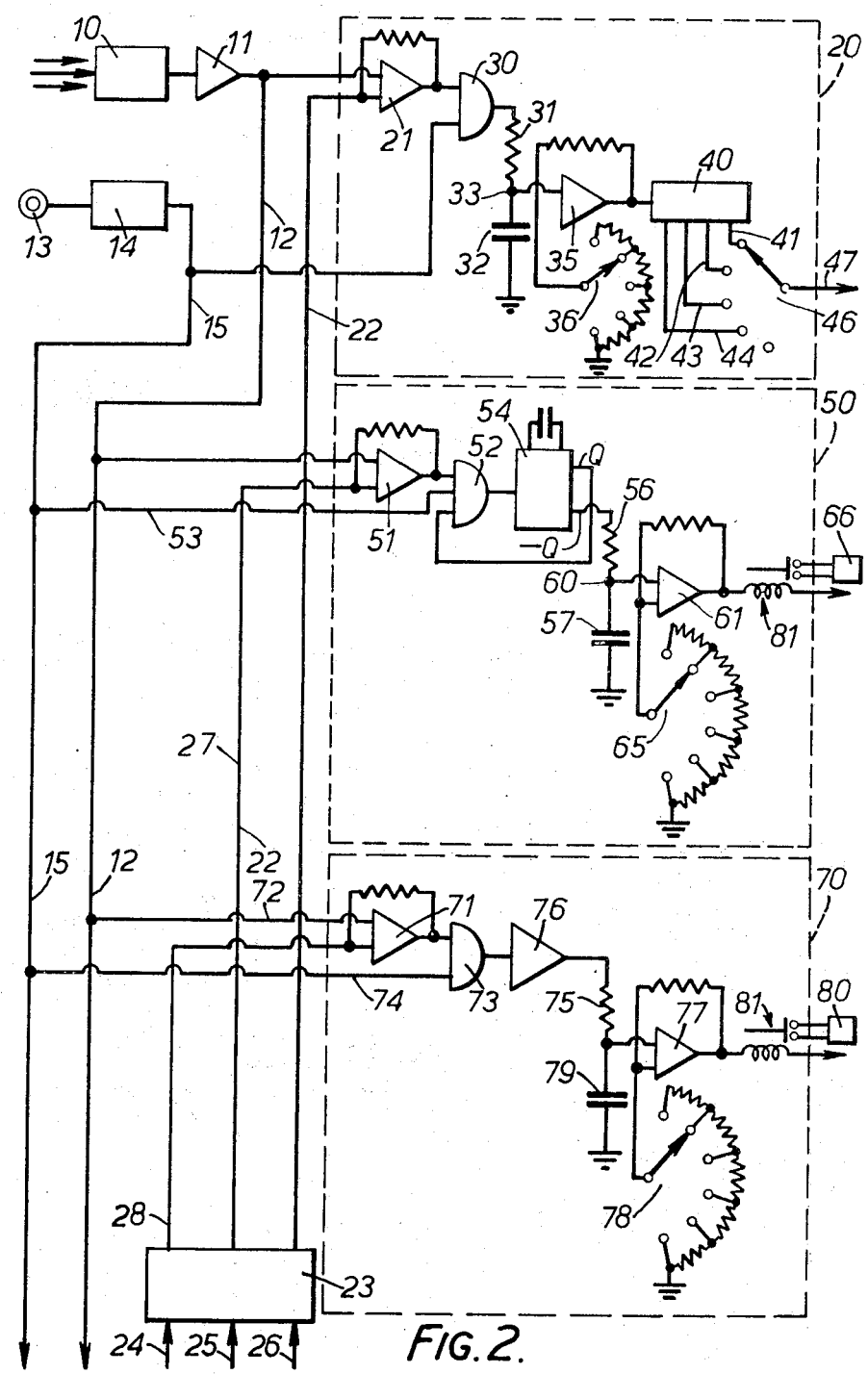

The invention may be performed in various ways and one specific embodiment will now be described by way of example with reference to the accompanying drawings in which:

FIG. 1 is a diagrammatic representation of a surface inspection apparatus constructed according to the invention, and FIG. 2 is a simplified block circuit diagram of the analysing system of the device shown in FIG. 1.

In this case the invention is applied to an automatic control or signalling system for use with apparatus handling a continuously moving web of paper or paper board. The paper 1 is caused to pass via slots 2, through an optical scanner 3 which comprises a narrow enclosed light box of appreciable height positioned above the paper web 1 with a rotating prism 4 (or mirror) at the top of the box 3, with its axis parallel to the direction of movement of the web. The prism in this example has twelve facets and is rotated at a speed of about 24,000 r.p.m. Near the top of the light box 3 at one side, there is mounted a laser 5 which projects a narrow beam of coherent light onto the mirror so as to be reflected downwards onto the web of paper moving across the narrow bottom area of the box. The laser beam 5 thus scans rapidly and sequentially across the paper web 1 and the speed is sufficient to scan substantially the whole area of the paper with a web speed of about 100 metres per minute. Also positioned in the light box is a photo-cell or photo-multiplier 10 arranged to receive the light reflected from the paper surface by the flying spot of light. The signal produced by this photo-cell will thus provide an indication at any instant of the reflective characteristics of the paper surface. In addition there is a synchronising photo-cell 13 arranged to produce a timing pulse at the start of each scan and this is positioned, in this example at one end of this scan path and is optically "aimed" at the rotating prism. The outputs from the two photo-cells 10, 13 are applied to the analysing system 6, which is controlled by a master unit 7 provided with control knobs 8 or other forms of control elements. Any outputs from the analysing system 6 operate warning or indicating devices 9 on the master unit 7.

As shown in the circuit diagram of FIG. 2 the output from the observing photo-cell or photo-multiplier 10 is passed through an amplifier 11 and connected to a busbar 12 while the output of the synchronising photo-cell 13 is passed through a pair of monostable multivibrators 14 provided with suitable controls to generate an output pulse whose shape determines the position and width of a selected part of the total scan cycle which is to be used under the particular conditions existing. For example the width of the effective scan across the paper web may be varied and also the centreline of this observed width. The output pulse from the multivibrators is applied to a second busbar 15.

From the busbars 12 and 15 connections are made to a number of individual analysing circuits of which three are shown by way of example in the diagram. The first circuit is indicated generally within the chain-line box 20 and is designed to act as a speck detector to determine the density and intensity of specks on the paper web. The signal from the amplifer 11 and busbar 12 is fed to a comparator 21 which also receives a signal on line 22 from a multiple threshold selector 23. The comparator produces an output only when the input from busbar 12 is above the selected threshold voltage and this provides a cut-off to exclude minute imperfections in the paper below a predetermined size. The thresold selector switch 23 has three inputs 24, 25, 26 of different values, to set different threshold levels, and has internal multiple stepping switches for connecting any one threshold input to the three threshold output lines 22, 27, 28 leading to the three analysing circuits.

The output from the comparator 21 is fed to a gate 30 having another input from the synchronising busbar 15 so that the gate will only produce an ouput during the selected synchronising pulse width. This output from the gate is passed through a dropping resistor 31 to charge a capacitor 32, the charge on the capacitor progressively increasing in accordance with the width of the incoming pulse so that the voltage at point 33 is a measure of the pulse width. This voltage is applied to another comparator 35 having another input derived from a multiposition stepping rheostat 36 and the comparator will produce an output only if the voltage at 33 is greater than the voltage from the potentiometer 36, which corresponds to an incoming pulse width over a selected minimum value, which might correspond in one particualr example say to a spot or speck on the paper having a diameter greater than 0.2 millimetres. The output from this comparator 35 is fed to an electronic counter unit 40. This may include various different types of subsidiary analysing circuits. In one example the counter has an integrator circuit arranged to count the number of incoming pulses or faults in any given period of time, the different levels of the count being applied to a number of separate output connections 41, 42, 43, 44 representing different levels of count. These output connections are connected to a further stepping multiple switch 46 operated by a remote stepping control and having a wiper connected to an output alarm connection 47. Depending upon the instantaneous position of the switch 46 the alarm circuit will be energised at a selected number of faults in the selected period of time.

In another form of counter there are a number of separate voltage comparator circuits similar to the comparator circuit 31, 32, 33, 35, 36, each adjustable to different values and each connected to an independent counting device with the outputs from these counters fed to a stepping multiple switch similar to the switch 46. This arrangement provides a means for selecting a limiting density or frequency of speck occurrence at different speck sizes.

The second logic circuit indicated generally at 50 is designed to recognise creases or other longitudinal defects in the paper parallel to the direction of movement of the web. The circuit logic is based on the fact that any longitudinal crease will cause a repeating peak on the input busbar 12 with the position of the peak occurring at sustantially the same point in each successive cycle. In this circuit the input from the busbar 12 is first fed to a comparator 51 having another input 27 from the multiple threshold selector 23. This sets the minimum intensity at which the circuit will respond. The output from the comparator is fed to a synchronising gate 52 having another input 53 from the synchronising busbar 15. This gate performs the same function as the gate 30 and its output is connected to a monostable multivibrator circuit 54 whose time constant is set to a value of approximately 98 per cent of each scan time or cycle. When a pulse enters the multivibrator 54 the monostable is triggered and its output is connected via a dropping resistor 56 to charge a capacitor 57. Simultaneously the other output of the monostable is connected via line 58 to another input of the synchronising gate 52 so as to prevent the monostable being re-triggered before it drops out. At the end of the time constant the monostable drops out and if a further input pulse arrives immediately afterwards the monostable is re-triggered and the cycle is repeated. The capacitor 57 is thus progressively charged to an increasing voltage, the voltage at point 60 being connected to a voltage comparator 61 which compares this sensed voltage with that derived from a stepping rheostat or potentiometer 65 which may be set for example to produce a voltage corresponding to that which would exist across the capacitor 57 if the monostable is re-triggered for say two hundred successive scan lines. This would correspond to a small elongated fault or cease in the paper web, the actual length depending upon the setting of the stepping potentiometer 65. This potentiometer also has a connection to an external remote control and can be operated by a stepping relay. The output from the comparator 61 is fed to an output relay switch 81 controlling an external indicating or alarm circuit 66 which will provide an indication when any crease or longitudinal defect of selected size is recognised.

The third analysing logic circuit indicated generally at 70 is designed to recognise transverse defects, joints, or splices, having a width above a predetermined minimum. The circuit includes a comparator 71 having a connection 72 to the input busbar 12 and also a connection 28 to the multiple threshold selector 23. The output of this comparator is fed to a synchronising gate 73 having a connection 74 to the synchronising busbar 15 and acting in the same way as the gates 30 and 52. The output from this gate is fed to an inverter 76 which changes the negative incoming pulse into a positive pulse and these positive voltage pulses are fed to a further integrating comparator circuit similar to those already described, including a dropping resistor 75 capacitor 79 a comparator 77 and a multi-position rheostat 78 for setting the level at which the comparator 77 will produce an output. This voltage value may be set for example to correspond to the voltage which will build-up across the capacitor 79 when there is a continuous input maintained for say 80 successive scans, which corresponds to a dark band of a preselected narrow width extending transversely across the paper web. The output from the comparator 77 is likewise connected to an output relay switch 81 controlling an external alarm circuit 80 to produce an indicating or alarm signal when a transverse defect of this type is sensed.

Similar separate analysing logic circuits may be included for detecting other characteristics of the paper surface. For example in order to detect general areas where the paper may be stained such a circuit would have a lower threshold level selected by the threshold selector 23 but a higher position at the potentiometer 78 so that the circuit would respond to lower intensities of incoming signals but only if and when the defect occurs over a substantial dimension lengthwise of the web. By combining the principle of the two circuits 50 and 70 the analysing circuit can be made to respond to stains which do not necessarily extend across the full width of the web but can be detected by their repeating occurrence at similar positions in successive scans.

The apparatus also includes a master control unit having remote control connections to relays or other local actuators for all the different switching or multiple stepping devices in the individual circuits. The master control unit may include manual and/or automatically actuated control elements, for example a punched card reader or a magnetic tape reader. For manual operation the control unit will include individual switches marked with letters or numbers and the operator will simply set-up any selected inspection programme from the coded input data given to him. For example in the case of the first speck detector circuit 20 the coded input will determine the setting of the multiple threshold level control 23, the level of the width setting potentiometer 36 and the position of the multiple fault count switch 46. This whole circuit can be disconnected by setting the switch 46 to a blank contact.

In the case of the crease detector circuit 50 the characteristics can be selected again by use of a code which determines the setting of the threshold level control 23, the value of the voltage developed at the potentiometer 65, and finally the closing or opening of the output relay switch 81 for the alarm circuit. Similar control signals can be used for the circuit 70.

I claim:

1. Apparatus for inspecting the surface of a web, comprising in combination a plurality of electro-optical devices capable of detecting the presence, nature and amplitude of changes of the surface appearance of the web and producing electrical signals representing variations in selected characteristics of the web surface, a plurality of electrical analyzing circuits, each for determining the presence and value of a respective one of various selected characteristics of the signals, corresponding to selected characteristics of the web surface, indicating means connected to the outputs of the analyzing circuits, and selector means for selectively energizing the analyzing circuits to provide by said indicating means an indication of at least one selected web surface characteristic.

2. Apparatus for monitoring the characteristics of a web, comprising an optical scanner for scanning the sheet, a photo-electric receiver for producing a signal corresponding to the observed light, and means for comparing various selected characteristics of the observed signal with corresponding respective datum signals, comprising a plurality of analyzing comparator circuits, each for determining the presence and value of a respective one of said various selected characteristics of the signal, corresponding to selected characteristics of the surface, selector means for selecting appropriate circuits to be actuated, and adjusting means for adjusting component factors in the comparator circuits.

3. Apparatus according to claim 2, wherein the adjusting means is effective to adjust individual values of the datum signals and for effecting an overall adjusting factor.

4. Apparatus according to claim 2, and additionally including means for providing an actuating signal in response to selected characteristics of the sheet.

5. Apparatus according to claim 1, including synchronizing means to relate the instantaneous observed signal to the instantaneous position of the scanning light produced by the scanner.

6. Apparatus according to claim 1, in which at least the majority of the selector means are non-continuously variable, multi-position, switching devices.

7. Apparatus according to claim 1, including a master control unit, and remote control means for actuating at least some of the selector means therefrom.

8. Apparatus according to claim 1, and means for preprogramming at least one of said analyzing circuits for determining a compound characteristic of the signal.

9. Apparatus according to claim 8, and means for preprogramming one of the analyzing circuits for determining an integrated amplitude level, said one circuit comprising filter means allowing signals beyond a predetermined threshold to pass therethrough and a counter for storing the number of signals passing the filter means.

10. Apparatus according to claim 8, and means for preprogramming one of the analyzing circuits for determining a repetition pattern, said one circuit comprising filter means allowing signals beyond a predetermined threshold to pass therethrough, a monostable multivibrator circuit whose time delay between operations is set to a value approximating to each scan time of the optical scanner, and an adder device capable of building up to a predetermined warning level only in response to a repetition of signals from the multivibrator from a predetermined number of successive scans of the optical scanner.

11. Apparatus according to claim 8, and means for preprogramming one of the analyzing circuits for determining a timed continuity at a selected amplitude, said one circuit comprising filter means allowing signals beyond a predetermined threshold to pass therethrough, and an adder device capable of building up to a predetermined warning level only in response to a repetition of signals from the filter means from a predetermined number of successive scans of the optical scanner.

12. Apparatus according to claim 1, and adjusting means for control of the analyzing circuits to determine threshold levels for the selected signal characteristics.

13. Apparatus according to claim 12, said indicating providing an indication of signals which exceed the respective threshold levels.

* * * * *